United States Patent
Matsuo et al.

(10) Patent No.: US 11,620,534 B2
(45) Date of Patent: Apr. 4, 2023

(54) AUTOMATIC GENERATION OF ISING HAMILTONIANS FOR SOLVING OPTIMIZATION PROBLEMS IN QUANTUM COMPUTING

(71) Applicant: International Business Machines Corporation, Armonk, NY (US)

(72) Inventors: Atsushi Matsuo, Funabashi (JP); Takashi Imamichi, Kawasaki (JP); Marco Pistoia, Amawalk, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 915 days.

(21) Appl. No.: 16/356,608

(22) Filed: Mar. 18, 2019

(65) Prior Publication Data

US 2020/0302306 A1 Sep. 24, 2020

(51) Int. Cl.
*G06N 10/00* (2022.01)
*G06N 5/00* (2006.01)

(52) U.S. Cl.
CPC .............. *G06N 5/003* (2013.01); *G06N 10/00* (2019.01)

(58) Field of Classification Search
CPC ................................. G06N 5/003; G06N 10/00
See application file for complete search history.

(56) References Cited

U.S. PATENT DOCUMENTS

| | | | |
|---|---|---|---|
| 7,277,872 B2 | 10/2007 | Raussendorf et al. | |
| 2008/0109500 A1* | 5/2008 | Macready ................ | G06J 3/00 708/2 |
| 2011/0191759 A1* | 8/2011 | Andrade ..................... | 717/151 |

FOREIGN PATENT DOCUMENTS

WO 2018170027 A1 9/2018

OTHER PUBLICATIONS

Wikipedia. "Ising Model" article from Feb. 17, 2019. https://en.wikipedia.org/w/index.php?title=Ising_model&oldid=883693782. Accessed Jan. 6, 2022. (Year: 2019).*
Programming with QUBOs, Technical report, D-Wave Systems, Inc., 2015, Release 2.1, 09-1002A-B. (Year: 2015).*
Lucas, Andrew. "Ising formulations of many NP problems." Frontiers in physics 2 (2014): 5. (Year: 2014).*
Technopedia. "Electronic Software Distribution (ESD)". Article from Jan. 5, 2019 retrieved via web.archive.org. https://web.archive.org/web/20190105173821/https://www.techopedia.com/definition/1502/electronic-software-distribution-esd. Retrieved Jan. 10, 2022. (Year: 2019).*

(Continued)

*Primary Examiner* — Markus A. Vasquez
(74) *Attorney, Agent, or Firm* — Garg Law Firm, PLLC; Rakesh Garg; Joseph Petrokaitis (57) ABSTRACT

Configuring a quantum computing system to determine a solution to an optimization problem includes encoding the optimization problem in an encoding language to produce an encoded optimization model. The encoded optimization model is transformed into a unconstrained model. The encoded optimization model includes an objective function having one or more terms. The one or more terms are converted to one or more Pauli terms. An Ising Hamiltonian is generated using the one or more terms. The Ising Hamiltonian corresponds to the optimization problem. An instruction indicative of the Ising Hamiltonian is provided to the quantum computing system.

14 Claims, 8 Drawing Sheets

(56) References Cited

OTHER PUBLICATIONS

Nielsen, Michael A., and Isaac L. Chuang. "Quantum Computation and Quantum Information." Front Matterand Chapter 2. (2010). (Year: 2010).*
Johnson et al. "Quantum annealing with manufactured spins." Nature 473.7346 (2011).
Biamonte et al., "Realizable Hamiltonians for universal adiabatic quantum computers." Physical Review A 78.1 (2008).
Tamir et al., "Notes on Adiabatic Quantum Computers." arXiv preprint arXiv:1512.07617 (2015).
Babbush, Towards Viable Quantum Computation for Chemistry. Diss. 2015.
Liu et al., "Simulating the ising model with a deep convolutional generative adversarial network." arXiv preprint arXiv:1710.04987 (2017).

\* cited by examiner

```
# Create an instance of a model and variables
mdl = Model (name = 'tsp')
x = {(i,p): mdl.binary_var(name='x_{0}_{1}',format(i,p)) for i in range(num_node) for p in range(num_node)}

#Object function
Tsp_func = mdl.sum(ins.w[i,j] •x[(i,p)] • x[(j,(p+1)Xnum_node)]for i in range(num_node) for j in range(num_node)
 for p in range(num_node))mdl.minimize(tsp_func)

#Constrains
for l in range (num_node):
    mdl.add_consraint(mdl.sum(x[(i,p)] for p in range(num_node))=1)
for p in range (num_node):
    mdl.add_consraint(mdl.sum(x[(i,p)] for i in range(num_node))=1)
```
⎫ 602

```
qubitop, offset = get_docplex_qubitops(mdl)
```
⎫ 604

*FIGURE 7*

702 Seed = 10598 spsa = SPSA(max_trials=300)
ry=RY(qubitOp.num_qubits, depth=5, entanglement="linear')
vqe=VQE(qubitope, ry, spsa, 'matrix')

backend = Aer.get_backend('statevector_simulator')
quantum_instance = QuantumInstance(backend=backend, seed=seed, seed_mopper=seed)

result = vqe.run(quantum_instance)

print('energy:', result["energy"])
print('time:', result["eval_time"])
x = tsp.sample_most_likely(result['eigvecs'][0])
print('feasible:', tsp.tsp_feasible(x))
z = tsp.get_tsp_solution(x)
print('solution:',z)
print('solution objective:', tsp.tsp_value(z, ins.w))
draw_tsp_solution(G, z, colors, pos)

FIGURE 8

AUTOMATIC GENERATION OF ISING HAMILTONIANS FOR SOLVING OPTIMIZATION PROBLEMS IN QUANTUM COMPUTING

TECHNICAL FIELD

The present invention relates generally to a method, system, and computer program product for configuring optimization problems to run in quantum computing data processing environments. More particularly, the present invention relates to a method, system, and computer program product for automatic generation of Ising Hamiltonians for solving optimization problems in quantum computing.

BACKGROUND

Hereinafter, a "Q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor using superconducting qubits (IBM is a registered trademark of International Business Machines corporation in the United States and in other countries.)

A superconducting qubit includes a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a qubit, the Josephson junction—which functions as a dispersive nonlinear inductor—is electrically coupled in parallel with one or more capacitive devices forming a nonlinear microwave oscillator. The oscillator has a resonance/transition frequency determined by the value of the inductance and the capacitance in the qubit. Any reference to the term "qubit" is a reference to a superconducting qubit oscillator circuitry that employs a Josephson junction, unless expressly distinguished where used.

The information processed by qubits is carried or transmitted in the form of microwave signals/photons in the range of microwave frequencies. The microwave frequency of a qubit output is determined by the resonance frequency of the qubit. The microwave signals are captured, processed, and analyzed to decipher the quantum information encoded therein. A readout circuit is a circuit coupled with the qubit to capture, read, and measure the quantum state of the qubit. An output of the readout circuit is information usable by a q-processor to perform computations.

A superconducting qubit has two quantum states—$|0\rangle$ and $|1\rangle$. These two states may be two energy states of atoms, for example, the ground ($|g\rangle$) and first excited state ($|e\rangle$) of a superconducting artificial atom (superconducting qubit). Other examples include spin-up and spin-down of the nuclear or electronic spins, two positions of a crystalline defect, and two states of a quantum dot. Since the system is of a quantum nature, any combination of the two states are allowed and valid.

For quantum computing using qubits to be reliable, quantum circuits, e.g., the qubits themselves, the readout circuitry associated with the qubits, and other parts of the quantum processor, must not alter the energy states of the qubit, such as by injecting or dissipating energy, in any significant manner or influence the relative phase between the $|0\rangle$ and $|1\rangle$ states of the qubit. This operational constraint on any circuit that operates with quantum information necessitates special considerations in fabricating semiconductor and superconducting structures that are used in such circuits.

SUMMARY

The illustrative embodiments provide a method, system, and computer program product. An embodiment includes a method for automatic generation of Ising Hamiltonians for solving optimization problems in quantum computing. An embodiment of a method for configuring a quantum computing system to determine a solution to an optimization problem includes encoding the optimization problem in an encoding language to produce an encoded optimization model. The embodiment further includes transforming the encoded optimization model into a unconstrained model, the encoded optimization model including an objective function having one or more terms. The embodiment further includes converting the one or more terms to one or more Pauli terms. The embodiment further includes generating an Ising Hamiltonian using the one or more terms, the Ising Hamiltonian corresponding to the optimization problem. The embodiment further includes providing an instruction indicative of the Ising Hamiltonian to the quantum computing system.

In another embodiment, the quantum computing system is configured to compute a result associated with the optimization problem based upon the Ising Hamiltonian. Another embodiment further includes receiving the result from the quantum computing system. In another embodiment, the result is a solution of the optimization problem.

In another embodiment, transforming the encoded optimization model into a unconstrained model comprises penalizing one or more equality constraints of the objective function by one or more penalty terms.

In another embodiment, the one or more terms include at least one of a linear term or a quadratic term. In another embodiment, the objective function is a linear objective function or a quadradic objective function. In another embodiment, the objective function further includes one or more binary decision variables associated with the optimization problem.

In another embodiment, the encoding of the optimization problem is performed by a user.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Computing of optimization problems is a well-recognized technological field of endeavor. Quantum computing using processors formed from quantum qubits is another well recognized technological field of endeavor. The present state of the technology in a combination of these two fields of endeavor has certain drawbacks and limitations. The operations and/or configurations of the illustrative embodiments impart additional or new capabilities to improve the existing technology in these technological fields of endeavor, especially in configuring optimization problems for execution in quantum computing environments.

A class of problems exists called optimization problems. An optimization problem is a computational problem in which the best or optimal solution is to be determined for a different problem where the different problem has several possible solutions. For example, the different problem can be the famous traveling salesman problem where a route has to be determined between several cities such that a traveling salesman covers each of the of cities without revising any of the cities. This problem has many possible solutions—routes between the cities. An optimization problem related to the traveling salesman problem is to find the shortest—i.e., the best or most optimal route—from the many possible routes, each of which satisfies the requirements of the traveling salesman problem.

Configuring an optimization problem for execution on a computer so that the computer can compute the optimal solution in finite time is a difficult problem in itself. Until recently, the only computing resources available for executing optimization problems were the conventional computers as described herein. Many optimization problems are too difficult or too complex for conventional computers to compute in finite time with reasonable resources. Generally, an approximated solution which can be computed in reasonable time and with reasonable resources is accepted as the near-optimal solution in such cases.

The advent of quantum computing has presented advancement possibilities in many areas of computing, including the computation of optimization problems. Because a quantum computing system can evaluate many solutions from the solution space at once, the illustrative embodiments recognize that such systems can be suitable for solving optimization problems.

The illustrative embodiments recognize that solving an optimization problem in quantum computing typically requires translating the optimization problem, along with its inputs, into an Ising Hamiltonian, and then passing the Ising Hamiltonian to a quantum variational algorithm, such as the Variational Quantum Eigensolver (VQE) algorithm and the Quantum Approximate Optimization Algorithm (QAOA).

The illustrative embodiments recognize that a problem of the prior-art approach for configuring optimization problems for execution using quantum computers is to build the Ising model required to generate the Ising Hamiltonian. Each different optimization problem requires the construction of its own unique Ising model. Therefore, solving optimization problems in quantum computing using prior-art methods requires building a different Ising model for each of those problem. This is a difficult and time-consuming task, which requires specialized knowledge. In prior-art methods, users are required to write Ising Hamiltonians for each type of optimization problem manually which is difficult due to the complicated and unintuitive nature of Ising Hamiltonians.

There are some modeling languages and tools for combinatorial optimization such as Optimization Programming Language (OPL), General Algebraic Modeling System (GAMS), and A Mathematical Programming Language (AMPL). Because they are designed to solve optimization problems classically, they do not have functionality to connect their models to quantum computers. D-Wave has a quantum annealing machine and some modeling tools, such as constraint satisfaction problem (CSP). However, none of such modeling languages or tools has the functionality to convert a general optimization model into an Ising Hamiltonian. Qiskit Aqua contains translators of very specific optimization problems into Ising Hamiltonians, but these are ad-hoc solutions, implemented on a case-by-case basis, with an Ising model manually built for each of the supported optimization problems. Qiskit Aqua does not contain any solution for a general optimization problem, and an automatic Ising Hamiltonian generator is not provided.

The illustrative embodiments dramatically simplify the task of designing and implementing quantum-computing-based solutions for optimization problems. The illustrative embodiments provide automatic generation of Ising models and the corresponding Ising Hamiltonians for different optimization problems. An embodiment encodes using classical computing as opposed to quantum computing. The optimization problem is encoded in a given language. For example, a particular embodiment uses a library called IBM™ Decision Optimization CPLEX Modeling for Python (DOcplex) to encode the optimization problem.

An embodiment takes that classically produced problem encoding and translates the encoding into an Ising Hamiltonian. The embodiment then passes the Ising Hamiltonian to a variational quantum algorithm for the computation of the solution on a quantum computer or simulator. Because of the solution provided by the illustrative embodiments for this difficult piece of optimization problem configuration in quantum computing, the number of optimization problems that can be solved using quantum computing is now greatly increased.

An embodiment builds an optimization model in an intuitive way. A particular embodiment uses DOcplex to encode the Ising model corresponding to an optimization problem. Different languages and/or libraries can be used to specify the Ising model corresponding to a particular optimization problem. The embodiment automatically generates the Ising Hamiltonian corresponding to the Ising model built by the user. The generated Ising Hamiltonian can then be passed as an input to a quantum algorithm, such as VQE and QAOA.

The quantum algorithm generates a quantum circuit. The quantum circuit is compiled and executed on a quantum computer or quantum simulator. DOcplex requires defining decision variables, constraints, and an objective function. DOcplex supports (1) binary, integer, and continuous variables, (2) linear and quadratic terms in constraints and objective functions, and (3) equality and inequality constraints. For simplicity, assume that it is desired to support (1) only binary decision variables, (2) linear and quadratic terms in constraints and objective functions, and (3) only equality constraints. Then, the following optimization formulation is the foundation for the generation of the Ising Hamiltonian:

Original formulation

Minimize $$\sum_{i \in I, j \in I} c_{i,j} x_i x_j + \sum_{i \in I} d_i x_i$$

Subject to $\sum_{i \in I} a_{i,j} x_i = b_j, j \in J$ $x_i \in \{0, 1\}, i \in I$ Note that I and J are sets of decision variables and constraints, respectively, $c_{i,j}, d_i, a_{i,j}, b_j$ are parameters and $x_i$ are binary decision variables. If the input problem is a maximization problem, the solution proposed by this invention multiplies the objective function by −1 to change it into a minimization problem.

An embodiment transforms the formulation into an unconstrained model by penalizing the constraints as follows. Note that $M_j$ is the penalty coefficient (parameter) of the j-th constraint.

Unconstrained model

Minimize $$\sum_{i \in I, j \in I} c_{i,j} x_i x_j + \sum_{i \in I} d_i x_i + \sum_{j \in J} M_j \left( b_j - \sum_i a_{i,j} x_i \right)^2$$

Subject to $x_i \in \{0, 1\}, i \in I$

In an embodiment, a method is provided to adjust the penalty coefficients $M_j$ corresponding to the j-th constraint automatically if all parameters $a_{i,j}$ and $b_j$ are integers for i∈I. Otherwise, in certain embodiments the penalty coefficients are disregarded as parameters and may be set manually by a user.

The objective function: $F(x) = \sum_{i \in I, j \in I} c_{i,j} x_i x_j + \sum_i d_i x_i +$ of an unconstrained model can be separated as $F(x) = f(x) + \sum_{j \in J} M_j P_j$ where $\sum_{i \in I, j \in I} c_{i,j} x_i x_j + \sum_i d_i x_i$ is the objective function of the original formulation and $$P_j(x) = (b_j - \sum_i a_{i,j} x_i)^2$$

is the penalty term of the j-th constraint. Because all variables $x_{i,j}$ are binary, $$\bar{f} = \sum_{i \in I, j \in I} \max(c_{i,j}, 0) + \max(d_i, 0)$$

is an upper bound of f(x). If all of $a_i$ and $b_j$ are integers, let $M_j = \bar{f} + \varepsilon$ where ε is a parameter (e.g., ε=1) to guarantee that the optimal solution of the unconstrained model is optimal to the original formulation.

If the j-th constraint is satisfied, $P_j(x) = 0$ holds. Otherwise, $P_j(x) > 0$ holds. Because all $a_i$ and $b_j$ are integer, $P_j(x) \geq 0$ holds if the constraint is not satisfied. Then, it also holds that $M_j P_j(x) > f(x)$ where $M_j = \bar{f} + \varepsilon$. Thus, if a solution x is feasible to the original formulation, $F(x) = f(x) \leq \bar{f}$ holds. Otherwise, $F(x) > \bar{f}$ holds. For example, because $a_i$ and $b_j$ of the TSP are integer, the following holds:

$$M_j = \sum_{i \in V, j \in V} \max(w_{i,j}, 0) + \varepsilon$$

An embodiment converts the linear and quadratic terms in the objective function of the unconstrained model into Pauli terms as follows:

Pauli terms in Ising Hamiltonian $$c_{i,j} x_i x_j \to c_{i,j} \frac{1 - Z_i}{2} \frac{1 - Z_j}{2}$$

$$d_i x_i \to d_i \frac{1 - Z_i}{2}$$

Finally, based on the Pauli terms above, an embodiment builds an Ising Hamiltonian corresponding to the original optimization problem. Consider the following example of how an embodiment allows for generating the Ising Hamiltonian for the Traveling Salesman Problem (TSP). Note that V denotes the set of nodes to be visited in the TSP, $w_{i,j}$ is a parameter denoting distances between the nodes, and $x_{i,p}$ are binary decision variables.

TSP can be formulated as follows:
Formulation of TSP
Minimize $$\Sigma_{i \in v, j \in V, p \in V} w_{i,j} x_{i,p} x_{j,p} + 1$$

Subject to $$\Sigma_{p \in t} x_{i,p} = 1, i \in V$$

$$\Sigma i \in V x_{i,p} = 1, p \in V$$

$$x_{i,p} \in \{0,1\}, i \in V, p \in V.$$

Figure 6:
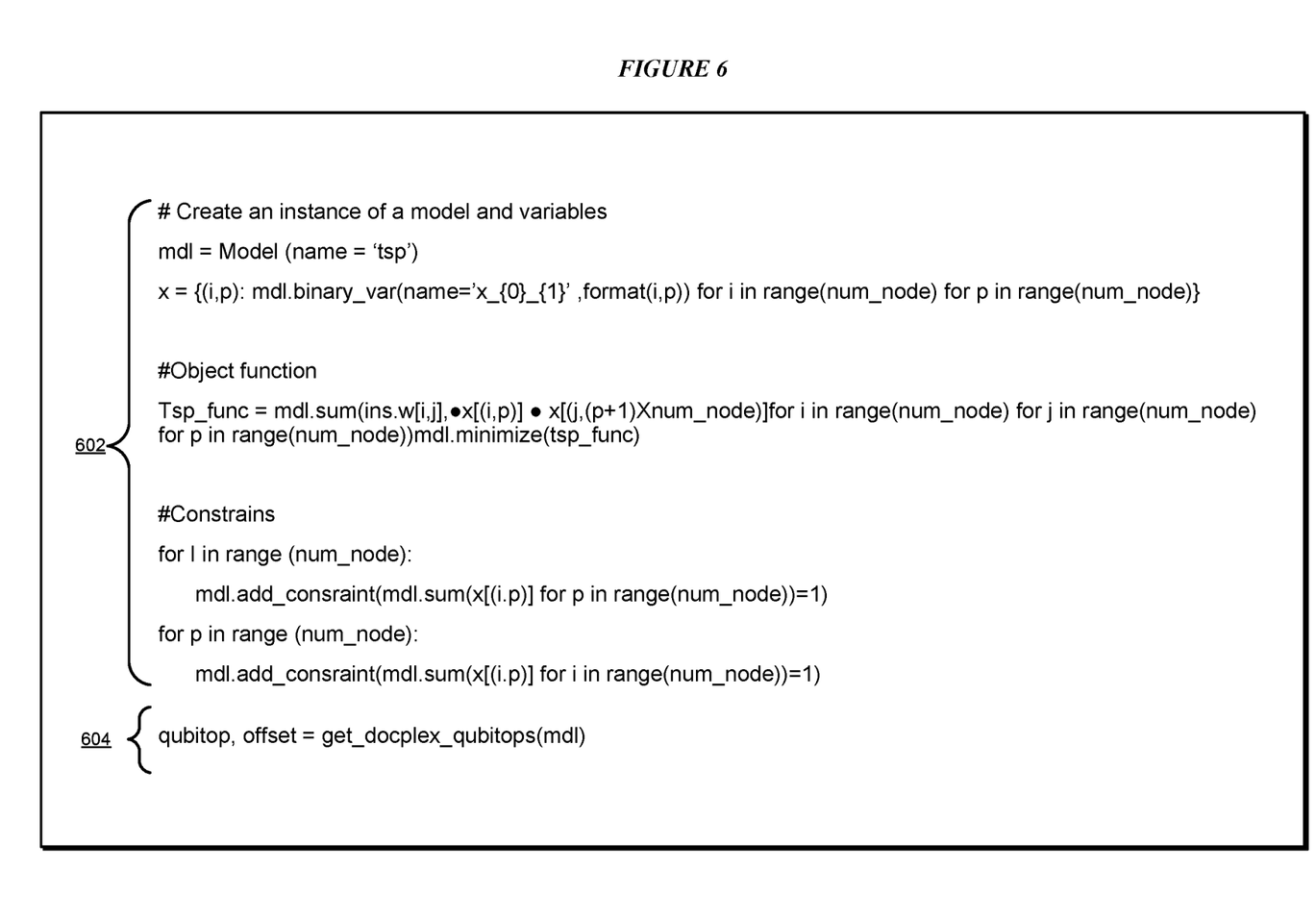
FIG. 6 depicts a code snippet.

An embodiment builds an optimization model of the formulation with an encoding language such as DOcplex. An example of an optimization model written in DOcplex is as follows: see FIG. 6, ref. num. 602.

An embodiment transforms the encoded optimization model into an Ising Hamiltonian. An example of generating an Ising Hamiltonian from the optimization model is as follows: see FIG. 6, ref. num. 604.

The above instruction contains a call to an Application Programming Interface (API) call that converts the linear and quadratic terms in the objective function of the unconstrained model into Pauli terms, and then builds the Ising Hamiltonian from those Pauli terms.

Finally, an embodiment calculates a solution to the optimization problem using the generated Ising Hamiltonian with a quantum processor or a quantum processor simulation executed by a classical processor.

Figure 7:
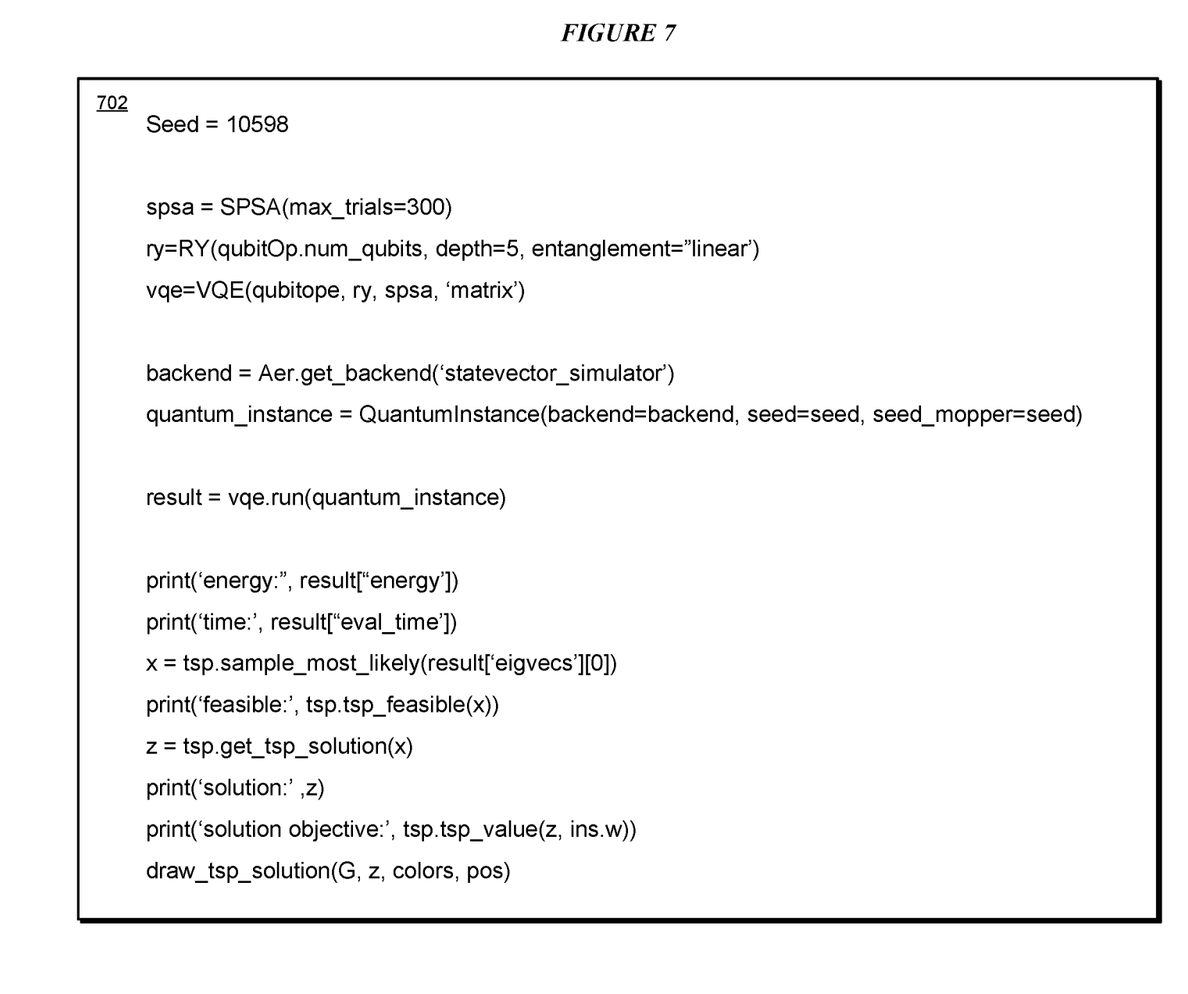
FIG. 7 depicts a code snippet.
Figure 8:
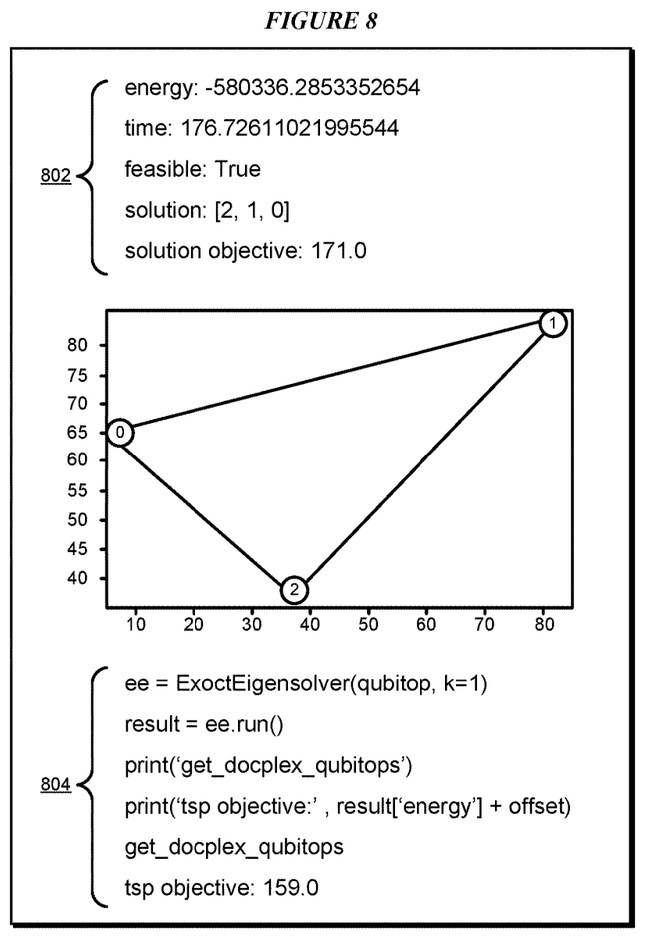
FIG. 8 depicts a code snippet and a graph.

An example of applying a solver in Qiskit Aqua is as follows: see FIG. 7, ref. num. 702; FIG. 8, ref. num. 802, 804, and the graph depicted therein.

Optimization problems are computation-intensive tasks. A thorough analysis of a solution space of an optimization problem can easily take several years on a commercially available conventional computer. Therefore, the illustrative embodiments also recognize that computing the optimal solution in a time-efficient manner using quantum computers is even more difficult using the presently available methods.

The present state of the technological field of endeavor of solving optimization problems using quantum computers presently does not include a mechanism to produce Ising Hamiltonians corresponding to the problem being solved. A need exists for generating the Ising Hamiltonian so that the quantum computer can actually perform the computation of solutions for optimization problems. A need exists that such generation be performed on a per-problem basis without manual preparation of Ising models.

The illustrative embodiments recognize that the presently available tools or solutions do not address these needs or provide adequate solutions for these needs. The illustrative embodiments used to describe the invention generally address and solve the above-described problems and other related problems by automatic generation of Ising Hamiltonians for solving optimization problems in quantum computing.

An embodiment can be implemented as a software application. The application implementing an embodiment, or one or more components thereof, can be configured as a modification of an existing quantum-classical data processing system—i.e., a native application in the classical computing system that produces inputs for a quantum computing system, as an application executing in a classical data processing system communicating with an existing quantum computing system over a network, as a separate application that operates in conjunction with an existing quantum-classical system in other ways, a standalone application for execution on a classical system, or some combination thereof.

The manner of automatic generation of Ising Hamiltonians for solving optimization problems in quantum computing described herein is unavailable in the presently available methods in the technological field of endeavor pertaining to quantum computing, particularly to configuring optimization problems for execution on quantum computers. A method of an embodiment described herein, when implemented to execute on a device or data processing system, comprises substantial advancement of the functionality of that device or data processing system in automatically generating Ising Hamiltonian instructions that are needed for configuring optimization problems for execution on quantum computers.

The illustrative embodiments are described with respect to certain types of algorithms, libraries, code, instructions, dimensions, data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
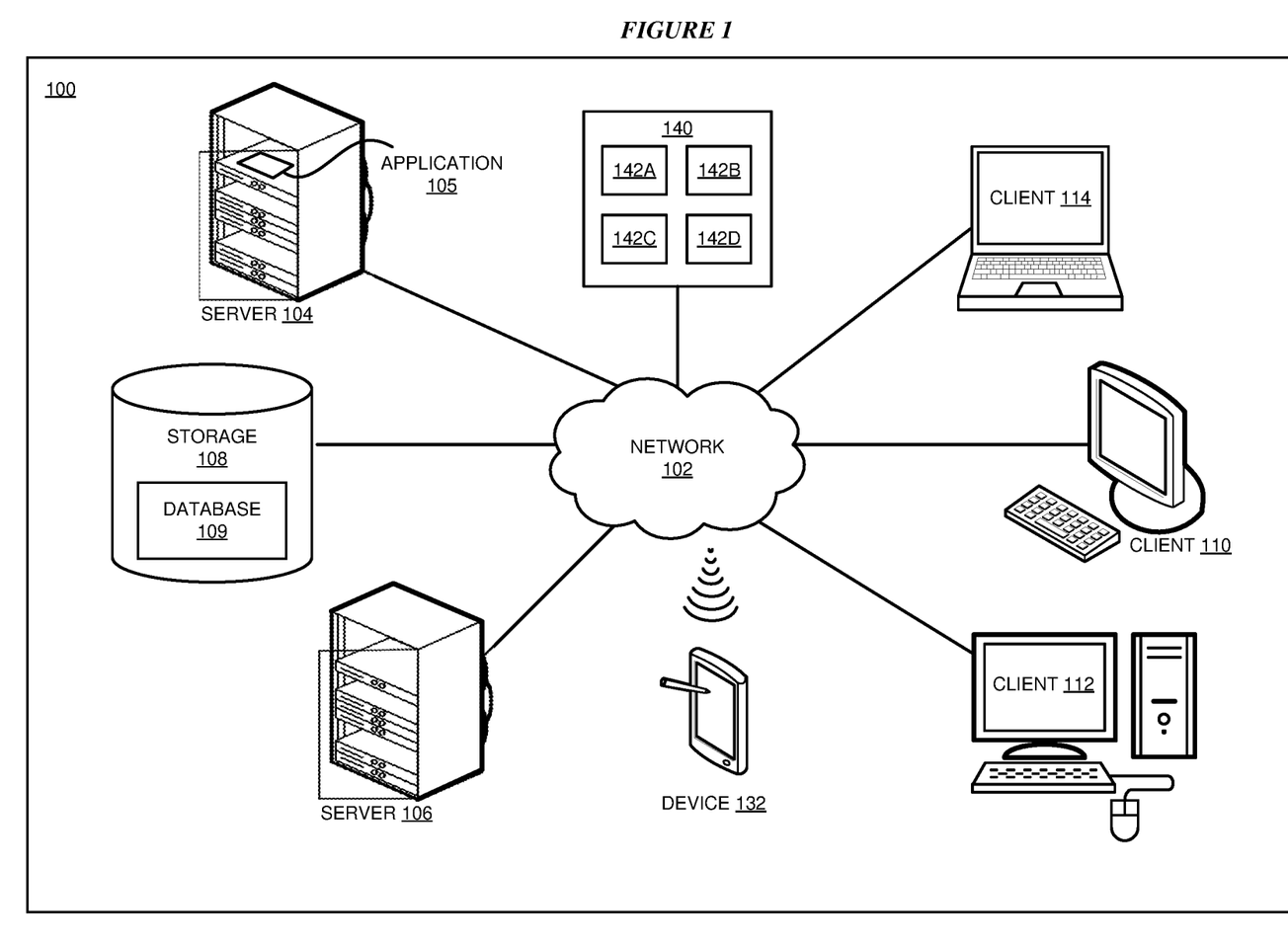
FIG. 1 depicts a block diagram of a network of data processing systems in which illustrative embodiments may be implemented.
Figure 2:
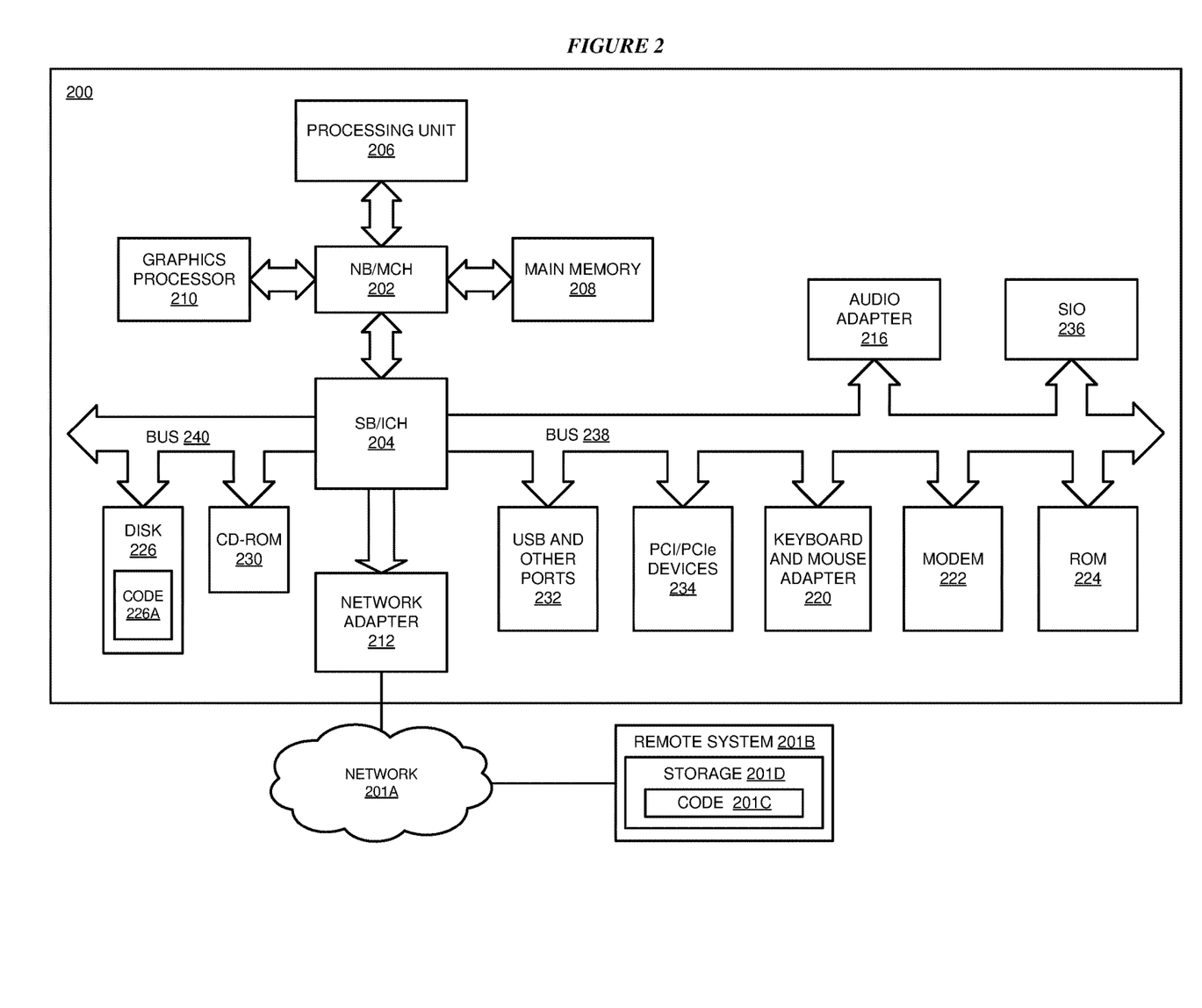
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of classical computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 are classical data processing systems and couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a classical data processing system, such as a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 implements the automatic generation of Ising Hamiltonian of an embodiment described herein. Application 105 passes, or causes to be passed, the generated Ising Hamiltonian as an input to quantum data processing systems 140. In the embodiment illustrated in FIG. 1, Q-system 140 includes a plurality of q-processors 142A-142D. Q-system 140 then performs the solution space exploration to determine the optimal solution of an optimization problem corresponding to the Ising Hamiltonian.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
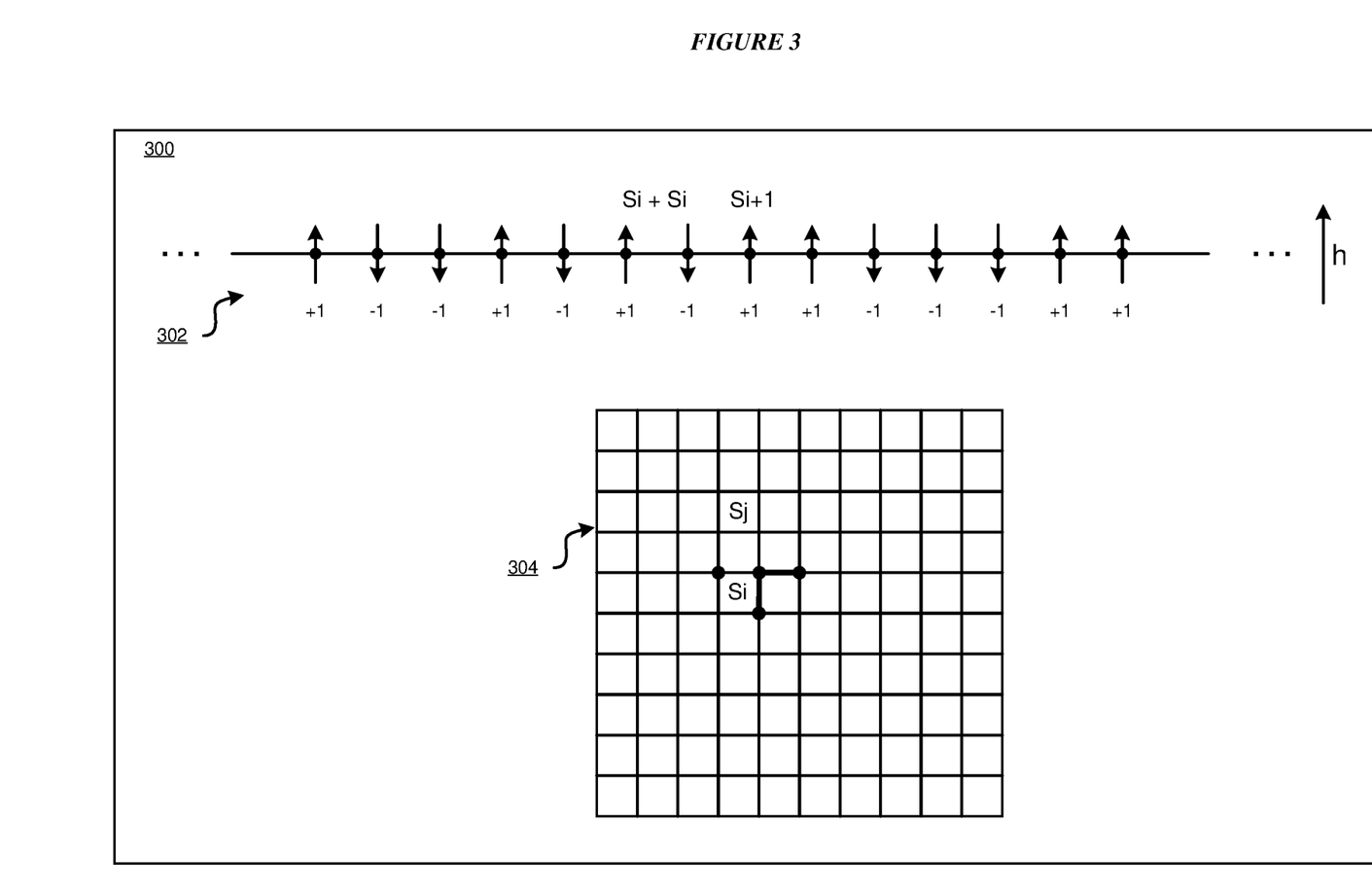
FIG. 3 depicts example diagrams of a 1-dimensional and a 2-dimensional Ising model.

With reference to FIG. 3, this figure depicts example diagrams of a 1-dimensional and a 2-dimensional Ising model. Ising (Z. Physik, 31, 253, 1925) introduced a model consisting of a lattice of "spin" variables Si, which can only take the values +1 (↑) and −1(↓). Every spin interacts with its nearest neighbors (2 in 1D) as well as with an external magnetic field h.

FIG. 3 illustrates an example 1-dimensional Ising model 302. The Hamiltonian of example 1D Ising model 302 is $$H(\{s_i\}) = -J\sum_{(i,j)} s_i s_j - h\sum_i s_i$$

The sum <i,j> is over nearest neighbors (j=i±1 in 1D).

J is a constant specifying the strength of interaction. The term "spin" and "magnetic field" in the Ising model originate from its initial application to the phenomenon of spontaneous magnetization in ferromagnetic materials such as iron. Each iron atom has an unpaired electron and hence a net spin (or magnetic moment). At low temperature, the spins spontaneously align giving rise to a non-zero macroscopic magnetic moment. The macroscopic magnetic moment disappears when the temperature exceeds the Curie temperature (1043 K for iron).

The Ising model can be applied to many other problems beyond magnetism, such as phase separation in binary alloys, crystal growth, and solving optimization problems. Higher dimension Ising models are generally used in solving many problems.

FIG. 3 further illustrates an example 2-dimensional Ising model 304. 2D Ising model 304 is defined over a square lattice of N spins under periodic boundary conditions. Again, the Hamiltonian can be written as $$H(\{s_i\}) = -J\sum_{\langle i,j \rangle} s_i s_j - h\sum_i s_i$$

J describes the strength of interaction, h is external magnetic field, and the sum is over all <i,j> nearest neighbor pairs. Each spin has 4 nearest neighbors.

Figure 4:
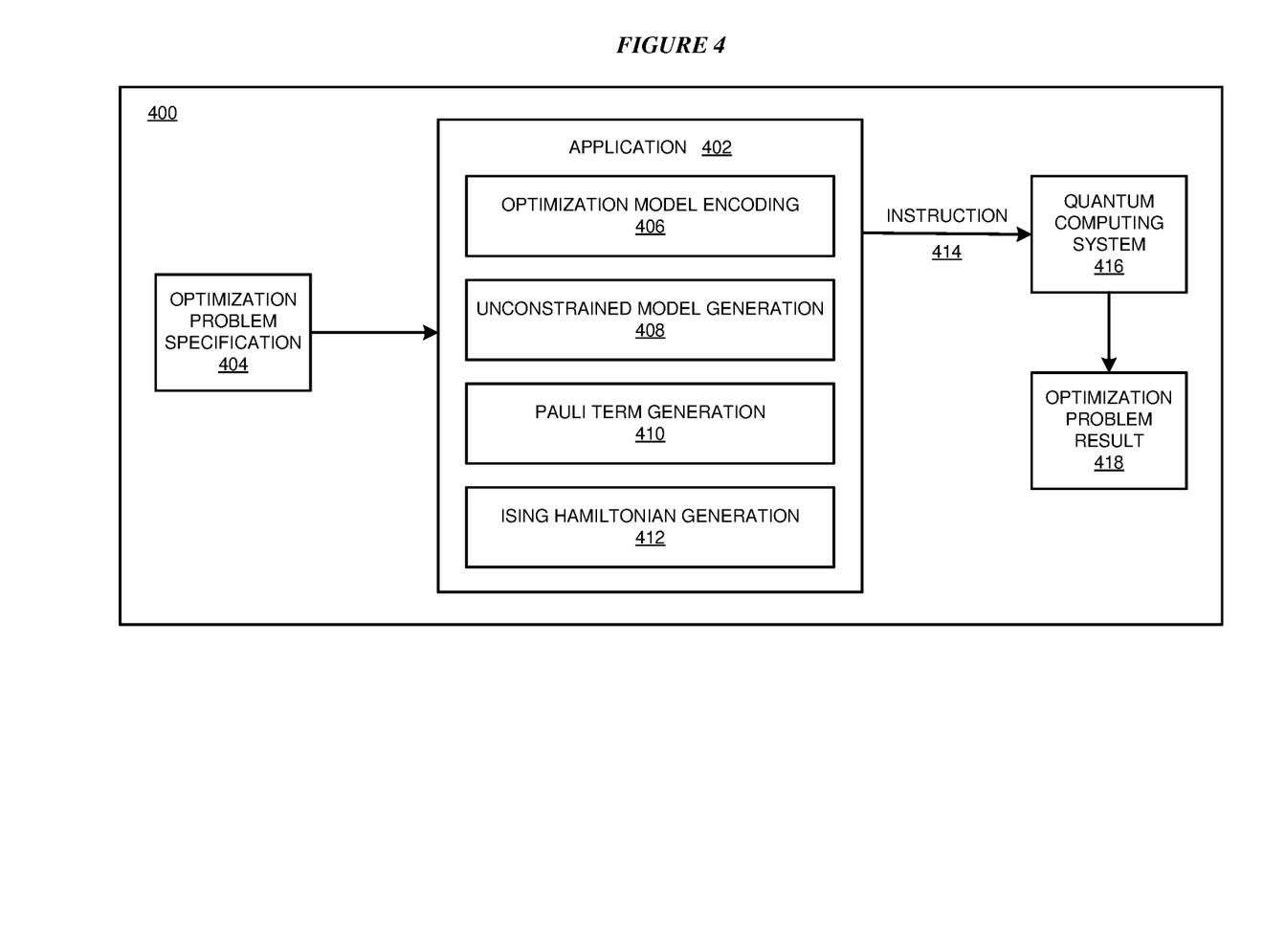
FIG. 4 depicts a block diagram of an example configuration for automatic generation of Ising Hamiltonians for solving optimization problems in quantum computing in accordance with an illustrative embodiment.

With reference to FIG. 4, this figure depicts a block diagram of an example configuration 400 for automatic generation of Ising Hamiltonians for solving optimization problems in quantum computing in accordance with an illustrative embodiment. In an embodiment, application 402 is an example of application 105 in FIG. 1.

Application 402 receives an optimization problem specification 404 specifying a particular optimization problem that is desired to be solved. Optimization model encoding component 406 is configured to facilitate a user to encode an optimization model corresponding to the optimization problem using an encoding language. In one or more embodiments, the optimization model includes one or more binary decision variables, an objective function (e.g., a quadradic objective function), and one or more equality constraints.

Unconstrained model generation component 408 is configured to transform the encoded optimization model into an unconstrained model. In one or more embodiments, unconstrained model generation component 408 transforms the encoded optimization model into the unconstrained model by penalizing the equality constraints of the quadratic objective function by one or more penalty terms. Pauli term generation component 410 is configured to convert the terms of the objective function of the unconstrained model to Pauli terms. In one or more embodiments, Pauli term generation component 410 is configured to convert the linear terms and quadratic terms in a quadratic objective function of the unconstrained model to Pauli terms.

Ising Hamiltonian generation component 412 is configured to generate an Ising Hamiltonian corresponding to the optimization problem using the Paula terms. Application 402 is further configured to send one or more instructions indicative of the Ising Hamiltonian to a quantum computing system 416. In a particular embodiment, quantum computing system 416 is an example of quantum computing system 140 of FIG. 1. Quantum computing system 416 is configured to receive the one or more instructions, generate a quantum circuit using the Ising Hamiltonian, and compute an optimization problem result 418.

Figure 5:
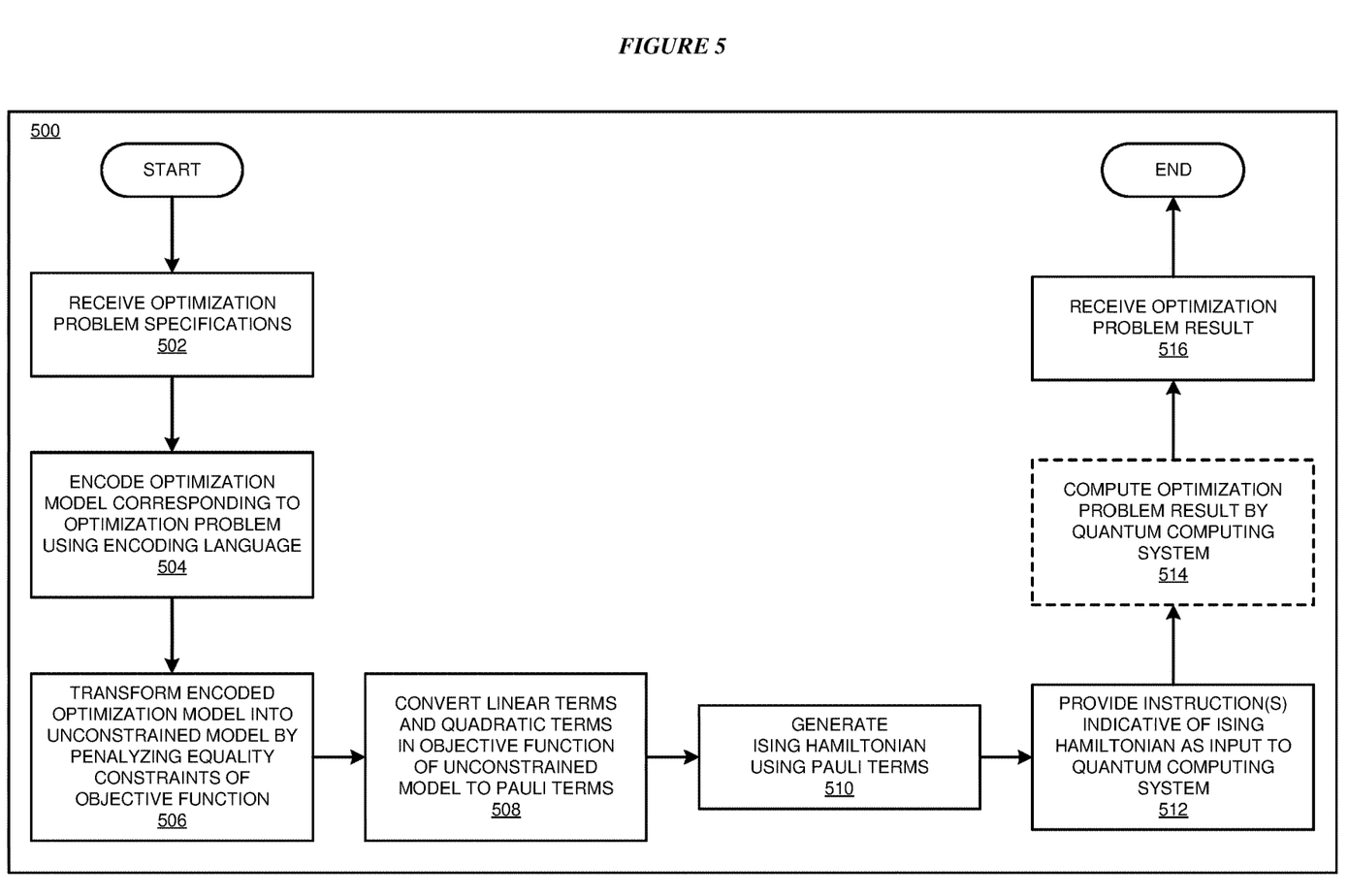
FIG. 5 depicts a flowchart of an example process for automatic generation of Ising Hamiltonians for solving optimization problems in quantum computing in accordance with an illustrative embodiment.

With reference to FIG. 5, this figure depicts a flowchart of an example process 500 for automatic generation of Ising Hamiltonians for solving optimization problems in quantum computing in accordance with an illustrative embodiment. In one or more embodiments, process 500 is implemented in part by application 105 or application 402.

In block 502, application 105 receives an optimization problem specification specifying a particular optimization problem that is desired to be solved. In block 504, application 105 encodes an optimization model corresponding to the optimization problem using an encoding language. In one or more embodiments, the optimization model includes one or more binary decision variables, an objective function (e.g., a linear or a quadradic objective function), and one or more equality constraints. In an alternative embodiment, a user receives the optimization problem specification and encodes the optimization model using an encoding language instead of application 105.

In block 506, application 105 transforms the encoded optimization model into an unconstrained model by penalizing the one or more equality constraints of the objective function by one or more penalty terms. In block 508, application 105 converts the one or more linear terms and one or more quadratic terms in the objective function of the unconstrained model to one or more Pauli terms.

In block 510, application 105 generates an Ising Hamiltonian corresponding to the optimization problem using the Paula terms. In block 512, application 105 provides one or more instructions indicative of the Ising Hamiltonian to a quantum computing system. In a particular embodiment, the quantum computing system is an example of quantum computing system 140 of FIG. 1. In one or more embodiments, the instruction includes the Ising Hamiltonian.

In block 514, the quantum computing system may optionally compute an optimization problem result using the Ising Hamiltonian. In a particular embodiment, the optimization problem result includes a solution to the optimization problem. In an alternative embodiment, the Ising Hamiltonian can be passed to a quantum algorithm, such as a VQE or a QAOA algorithm to generate a quantum circuit, which will then be compiled and executed on a quantum computer or quantum computer simulator to compute the optimization problem result. In block 516, application 105 receives the optimization problem result and process 500 ends.

Thus, a computer implemented method, system or apparatus, and computer program product are provided in the illustrative embodiments for automatic generation of Ising Hamiltonians for solving optimization problems in quantum computing and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    encoding an optimization problem in an encoding language to produce an encoded optimization model;
    transforming the encoded optimization model into a corresponding unconstrained model, the encoded optimization model including an objective function having one or more terms, wherein the unconstrained model comprises an automatically adjusted penalty term corresponding to a constraint on at least one parameter of the optimization problem, wherein the objective function further includes one or more binary decision variables associated with the optimization problem;

replacing each binary decision variable $x_i$ of the one or more binary decision variables with a respective corresponding Pauli term, the respective corresponding Pauli term defined by the expression $(1-Z_i)/2$;

generating an Ising Hamiltonian using the corresponding Pauli term, the Ising Hamiltonian corresponding to the optimization problem; and providing an instruction indicative of the Ising Hamiltonian to a quantum computing system;

configuring, in the quantum computing system, at least one qubit to execute a quantum variational algorithm according to the instruction; and executing, in the quantum computing system, the quantum variational algorithm using the configured qubit, the executing producing a solution to the optimization problem, wherein a quantum state of the configured qubit is interpreted to generate the solution.

2. The method of claim 1, further comprising: receiving the solution from the quantum computing system.

3. The method of claim 1, wherein the automatically adjusted penalty term affects one or more equality constraints of the objective function.

4. The method of claim 1, wherein the one or more terms include at least one of a linear term or a quadratic term.

5. The method of claim 1, wherein the objective function is a linear objective function or a quadradic objective function.

6. The method of claim 1, wherein the encoding of the optimization problem is performed by a user.

7. A computer usable program product comprising one or more computer-readable storage media, and program instructions stored on at least one of the one or more storage media, the stored program instructions comprising:

program instructions to encode an optimization problem in an encoding language to produce an encoded optimization model;

program instructions to transform the encoded optimization model into a corresponding unconstrained model, the encoded optimization model including an objective function having one or more terms, wherein the unconstrained model comprises an automatically adjusted penalty term corresponding to a constraint on at least one parameter of the optimization problem, wherein the objective function further includes one or more binary decision variables associated with the optimization problem;

program instructions to replace each binary decision variable $x_i$ of the one or more binary decision variables with a respective corresponding Pauli term, the respective corresponding Pauli term defined by the expression $(1-Z_i)/2$;

program instructions to generate an Ising Hamiltonian using the corresponding Pauli term, the Ising Hamiltonian corresponding to the optimization problem; and program instructions to provide an instruction indicative of the Ising Hamiltonian to a quantum computing system;

program instructions to configure, in the quantum computing system, at least one qubit to execute a quantum variational algorithm according to the instruction; and program instructions to execute, in the quantum computing system, the quantum variational algorithm using the configured qubit, the executing producing a solution to the optimization problem, wherein a quantum state of the configured qubit is interpreted to generate the solution.

8. The computer usable program product of claim 7, further comprising:

program instructions to receive the solution from the quantum computing system.

9. The computer usable program product of claim 8, wherein the stored program instructions are stored in a computer readable storage device in a data processing system, and wherein the stored program instructions are transferred over a network from a remote data processing system.

10. The computer usable program product of claim 8, wherein the stored program instructions are stored in a computer readable storage device in a server data processing system, and wherein the stored program instructions are downloaded over a network to a remote data processing system for use in a computer readable storage device associated with the remote data processing system.

11. The computer usable program product of claim 7, wherein the automatically adjusted penalty term affects one or more equality constraints of the objective function.

12. The computer usable program product of claim 7, wherein the one or more terms include at least one of a linear term or a quadratic term.

13. The computer usable program product of claim 7, wherein the objective function is a linear objective function or a quadradic objective function.

14. A computer system comprising one or more processors, one or more computer-readable memories, and one or more computer-readable storage media, and program instructions stored on at least one of the one or more storage media for execution by at least one of the one or more processors via at least one of the one or more memories, the stored program instructions comprising:

program instructions to encode an optimization problem in an encoding language to produce an encoded optimization model;

program instructions to transform the encoded optimization model into a corresponding unconstrained model, the encoded optimization model including an objective function having one or more terms, wherein the unconstrained model comprises an automatically adjusted penalty term corresponding to a constraint on at least one parameter of the optimization problem, wherein the objective function further includes one or more binary decision variables associated with the optimization problem;

program instructions to replace each binary decision variable $x_i$ of the one or more binary decision variables with a respective corresponding Pauli term, the respective corresponding Pauli term defined by the expression $(1-Z_i)/2$;

program instructions to generate an Ising Hamiltonian using the corresponding Pauli term, the Ising Hamiltonian corresponding to the optimization problem; and program instructions to provide an instruction indicative of the Ising Hamiltonian to a quantum computing system;

program instructions to configure, in the quantum computing system, at least one qubit to execute a quantum variational algorithm according to the instruction; and program instructions to execute, in the quantum computing system, the quantum variational algorithm using the configured qubit, the executing producing a solution to the optimization problem, wherein a quantum state of the configured qubit is interpreted to generate the solution.

\* \* \* \* \*